(12) United States Patent
Mattoni et al.

(10) Patent No.: US 11,149,856 B2
(45) Date of Patent: Oct. 19, 2021

(54) DYNAMIC SEALING DEVICE

(71) Applicant: EURO TECHNIQUES INDUSTRIES, Gemenos (FR)

(72) Inventors: Gaëtan Mattoni, Saint-Cyr-de-Favieres (FR); Brice Berenger, Hyeres (FR)

(73) Assignee: EURO TECHNIQUES INDUSTRIES, Gemenos (FR)

( * ) Notice: Subject to any disclaimer, the term of this patent is extended or adjusted under 35 U.S.C. 154(b) by 145 days.

(21) Appl. No.: 16/135,330

(22) Filed: Sep. 19, 2018

(65) Prior Publication Data

US 2019/0085980 A1 Mar. 21, 2019

(30) Foreign Application Priority Data

Sep. 21, 2017 (FR) ...................................... 1758755

(51) Int. Cl.
*F16J 15/32* (2016.01)
*F16J 15/3232* (2016.01)
*F16J 15/3236* (2016.01)

(52) U.S. Cl.
CPC ....... *F16J 15/3232* (2013.01); *F16J 15/3236* (2013.01)

(58) Field of Classification Search
CPC .. F16J 15/3228; F16J 15/3236; F16J 15/3284; F16J 15/46; B63B 21/507
See application file for complete search history.

(56) References Cited

U.S. PATENT DOCUMENTS

| | | | | |
|---|---|---|---|---|
| 1,788,496 A | * | 1/1931 | Smith | F16J 15/28 |
| | | | | 277/530 |
| 4,305,593 A | * | 12/1981 | Smith | F16J 15/164 |
| | | | | 277/367 |
| 5,297,804 A | * | 3/1994 | Siegrist | F16J 15/3236 |
| | | | | 277/433 |
| 5,897,119 A | * | 4/1999 | McMillen | F16J 15/3224 |
| | | | | 277/562 |
| 5,979,904 A | | 11/1999 | Balsells | |

FOREIGN PATENT DOCUMENTS

| | | |
|---|---|---|
| EP | 2 975 305 | 1/2016 |
| FR | 1 551 830 | 12/1968 |
| FR | 2 598 769 | 11/1987 |

OTHER PUBLICATIONS

French Search Report, FR 1758755, dated May 15, 2018.

* cited by examiner

*Primary Examiner* — Gilbert Y Lee
(74) *Attorney, Agent, or Firm* — Nixon & Vanderhye

(57) ABSTRACT

Disclosed is a dynamic sealing device configured to provide sealing between at least a first part and at least a second part having a relative rotational movement in relation to the first part. The device includes a seal provided with a first lip and with a second lip extending from a body portion, the first lip facing the second lip, the seal being formed from a first predetermined material having a first coefficient of friction, and a ring formed from a second predetermined material different from the first predetermined material and having a second coefficient of friction different from the first coefficient of friction. The ring is securely connected with the seal at the location of the body portion and the first coefficient of friction of the first predetermined material forming the seal is greater than the second coefficient of friction of the second predetermined material forming the ring.

20 Claims, 3 Drawing Sheets

DYNAMIC SEALING DEVICE

FIELD OF THE INVENTION

The present invention concerns dynamic sealing devices configured to provide sealing between two parts having relative movement in relation to each other.

TECHNOLOGICAL BACKGROUND

Dynamic sealing devices installed in equipment under pressure, also called swivel joints, can have an application in petroleum production ships in the offshore field, enabling the exploitation of hydrocarbon fields at sea at depths which are sometimes very great. Floating production storage and off-loading (FPSO) units are in general formed by a ship which is movable, on account of its environment, around a mooring turret, which is geostationary. The ship is generally secured temporarily to the turret and pipes forming a network of subaqueous ducts enable fluidic communication for the transfer of a fluid between the turret and the ship.

To provide sealing between the ship and the turret and thereby provide the integrity of the fluid transfer, a dynamic sealing device may be interposed between a member fixed to the turret and a movable member of the ship. Such a device may comprise one or more seals having a U-shaped or V-shaped section as well as one or more anti-extrusion rings distinct from the seals.

Such a seal is provided with a body portion, with two lips and optionally with a pre-stressing spring disposed between the lips to return them to a spread position in which they provide a sealing function. The anti-extrusion ring is disposed freely against the body portion. This ring is sandwiched between the fixed member or the movable member and the body portion of the seal.

The lips have the function of providing sealing with respect to fluid while the function of the body portion is to provide the mechanical integrity of the seal and to withstand the pressure of the fluid. Such a body portion is often solid and contributes to the geometric stability of the seal while ensuring resistance to the pressure by virtue of its mechanical inertia. As for the spring, this enables the filling of a cavity formed between the lips, with the fluid to transfer or with another fluid, referred to as pressurization fluid, by maintaining a sufficient contact pressure of the lips on the faces of the members against which they come to bear so as to avoid leakages. Such a spring, which is optional, often has a purpose of providing sealing at atmospheric pressure and at low pressure.

In operation, that is to say when the fixed and movable members are mechanically connected with each other and the sealing devices are interposed between those members, at least one of the lips and/or the body portion are likely to slide on the faces of the members against which they bear. Such sliding gives rise to a phenomenon of friction on the seal.

To limit the premature wear of the seal with regard to this phenomenon of friction, it is known to produce it from a synthetic polymer and in particular from polytetrafluoroethylene (PTFE) and from equivalent fluoro-polymer materials (for example from "perfluoroalkoxyalkane" or PFA, "polychlorotrifluoroethylene" or PCTFE, ethylene tetrafluoroethylene or ETFE) or from polyurethane (PU). In this type of offshore use, the fluoro-polymers are appropriate materials in particular for withstanding friction forces, in particular on account of its coefficient of friction and its suppleness.

As regards the anti-extrusion ring, this is formed from a harder material than the seal so as to form a barrier between the body portion of the seal and the face of the member at the location of which it is freely interposed. In particular, it is known to produce such a ring using polyetheretherketone (PEEK) either pure or mixed with fillers.

This ring also has the function of limiting the premature wear of the seal, which may be caused by a phenomenon referred to as extrusion itself caused by an effect of creep of the seal when the latter is under load, that is to say under pressure, and subjected to high pressure (in particular on account of the rotational movement of the movable member in relation to the fixed member).

SUBJECT OF THE INVENTION

The invention is directed to providing a radial sealing device with improved performance, in terms of levels of leakage, in terms of withstanding friction and in terms of resistance to extrusion, with the aim of limiting the premature wear of such a device.

Thus, according to a first aspect, the invention relates to a dynamic sealing device configured to ensure sealing between at least one first part and at least one second part having a relative rotational movement in relation to the first part, the device comprising a seal provided with a first lip and with a second lip extending from a body portion, the first lip facing the second lip, the seal being formed from a first predetermined material having a first coefficient of friction and a ring formed from a second predetermined material different from the first predetermined material and having a second coefficient of friction different from the first coefficient of friction; the device being characterized in that the ring is securely connected with the seal at the location of the body portion and in that the first coefficient of friction of the first predetermined material forming the seal is greater than the second coefficient of friction of the second predetermined material forming the ring.

In the device according to the invention, the ring of the device makes it possible to provide optimized sliding of the body portion of the seal on the first part and/or the second part; such that the lips of the seal slide little or do not slide and therefore wear little or do not wear.

In the device according to the invention, the seal of the device makes it possible to provide better resistance at pressures and/or temperatures higher than those of the device of the prior art; whereas the ring, which is attached to the seal and which enables small friction forces to be withstood, is protected by the seal.

The first predetermined material has mechanical properties which enable it to mechanically withstand all three of pressure, temperature and dynamic stresses; while the second predetermined material has mechanical properties which enable it substantially to mechanically withstand dynamic stresses.

It will be noted that the first predetermined material furthermore has different mechanical properties from the second predetermined material in that the latter is more flexible and/or less hard than the first predetermined material.

The combination which is directed to securely connecting the ring with the seal and which is furthermore directed to having the ring present a coefficient of friction lower than the seal and therefore better withstand than the seal in particular friction forces undergone by the sealing device, thus makes it possible to supply a sealing device of which the service pressure and/or service temperature may be extended, of which the friction torque generated between the first and/or second parts and the device may be optimized, while limiting its premature wear and therefore increasing its live.

Other preferred, simple, convenient and economical features of the dynamic sealing device are mentioned below.

According to an embodiment, the first predetermined material is mainly produced from polyetheretherketone (PEEK) and the second predetermined material is mainly produced from a material chosen from polytetrafluoroethylene (PTFE), perfluoroalkoxy alkane (PFA), polychlorotrifluoroethylene (PCTFE), ethylene tetrafluoroethylene (ETFE) and polyurethane (PU)

According to an embodiment, the seal is annular and the first and second lips each extend from the body portion in a respective direction which is inclined relative to a radial direction of the seal.

According to an embodiment, the body portion and the first and second lips are configured such that the seal has, in section, a general shape of a U or a V.

According to an embodiment, the first and second lips define between them a cavity of the seal and are furthermore each provided with a turned-back portion directed towards the cavity.

According to an embodiment, the device further comprises a pre-stressing spring accommodated in the cavity of the seal.

According to an embodiment, the ring is configured so as to cover between approximately 10% and approximately 95% of an inside face of the seal.

According to an embodiment, the ring is permanently accommodated in the seal.

According to an embodiment, the ring is accommodated in a recess provided in the body portion remotely from the first and second lips.

According to a second aspect, the invention also relates to a connecting mechanism for connecting at least one first part with at least one second part having a relative rotational movement in relation to the first part. The mechanism comprises a first member configured to be connected to the first part, a second member movable relative to the first member and configured to be connected to the second part, the first member and the second member being connected with each other for the transfer of a fluid from one of the first and second parts to the other of the first and second parts, as well as at least one sealing device according to the first aspect of the invention, disposed in at least one groove provided in the mechanism located at a junction between the first member and the second member.

According to an embodiment, the first member forms part of a mooring turret of a floating production unit and the second member forms part of a platform extending from a ship moored to the mooring turret.

BRIEF DESCRIPTION OF THE DRAWINGS

Other advantages, objectives and features of the present invention are given by the following description of an example embodiment, given by way of non-limiting illustration with reference to the accompanying drawings in which.

DETAILED DESCRIPTION OF AN EMBODIMENT

Figure 1:
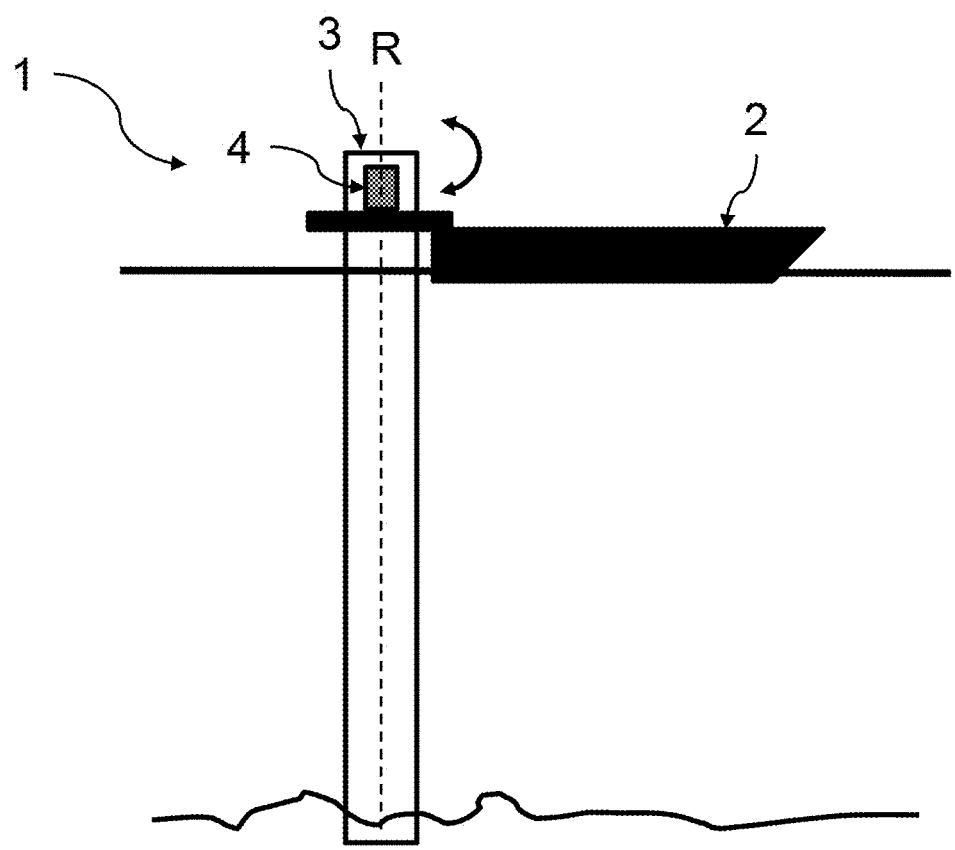
FIG. 1 diagrammatically and partially represents a floating production unit comprising a ship and a turret, of which the fluidic communication is provided in particular by a connecting mechanism provided with at least one sealing device in accordance with the invention.

FIG. 1 diagrammatically and partially represents a floating production unit 1, comprising a ship 2 and a mooring turret 3.

The turret 3 is mechanically connected here to a platform extending from the ship 2. The turret 3 is fixed whereas the ship 2 is able to turn around the turret 3. The ship is thus rotationally movable around the axis R represented in FIG. 1. Pipes (not shown) forming a network of subaquatic ducts enable fluidic communication for the transfer of a fluid between the turret 3 and the ship 2.

To provide sealing between the ship 2 and the turret 3 and thereby provide the integrity of the fluid transfer, a mechanism 4, also called swivel joint, is interposed between a fixed member (also called first member) of the turret 3 and a movable member (also called second member) of the platform of the ship 2.

The mechanism 4 provides sealing during a transfer of fluid between the turret and the platform.

Electronic communications may also be provided between the turret and the platform via the mechanism 4.

Figure 2:
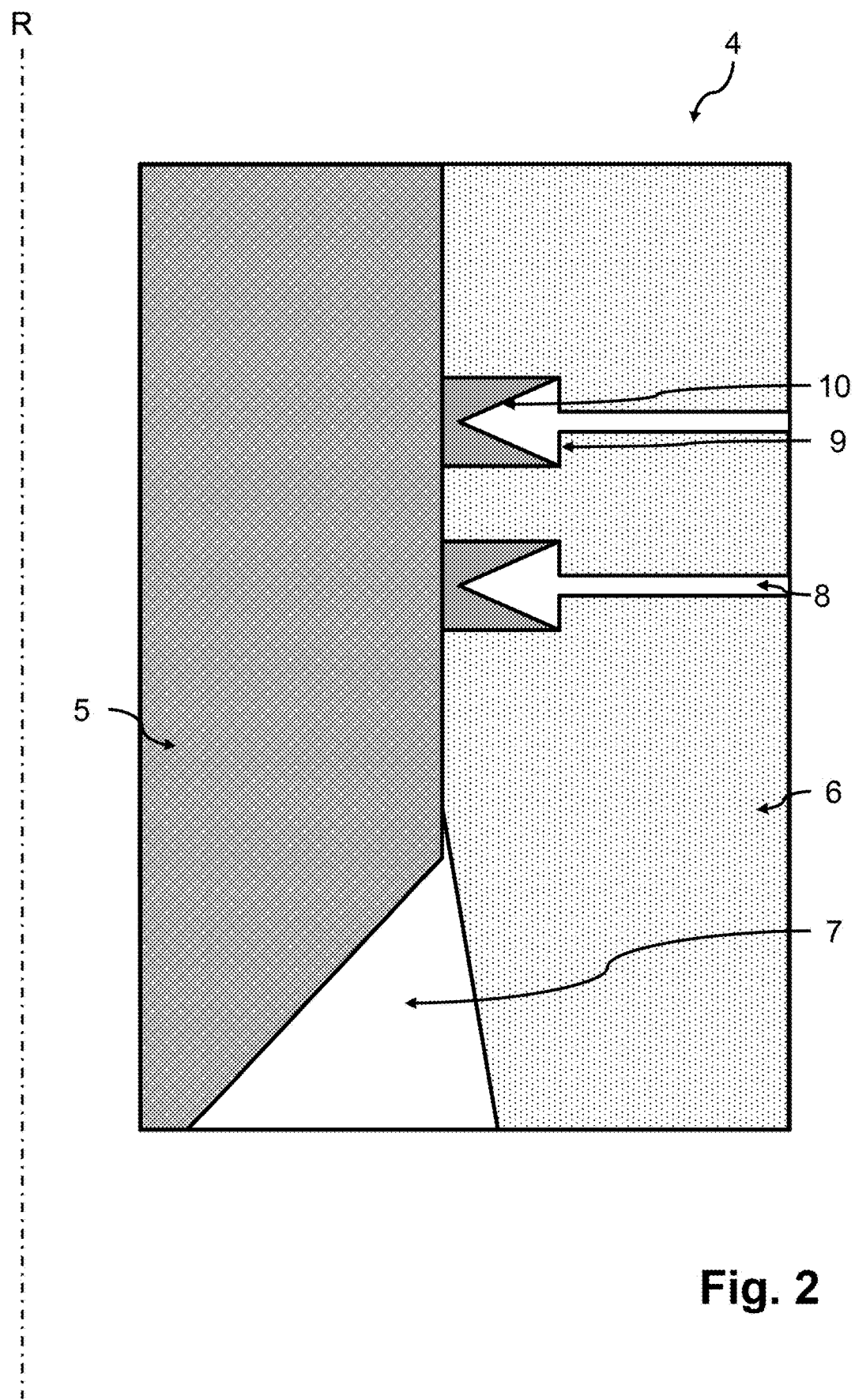
FIG. 2 is a cross-section view of the connecting mechanism of FIG. 1, showing several sealing devices according to the invention.

FIG. 2 shows a partial cross-section of the mechanism 4, provided with the fixed member 5 and the movable member 6 which are joined to each other here to provide the transfer of the fluid via a main cavity 7 provided between those members 5, 6.

The mechanism 4 is provided with the radial channels 8 opening into grooves 9 formed substantially at the location of the junction between the members 5 and 6. In at least some of these grooves 9 a sealing device may be accommodated.

Figure 3:
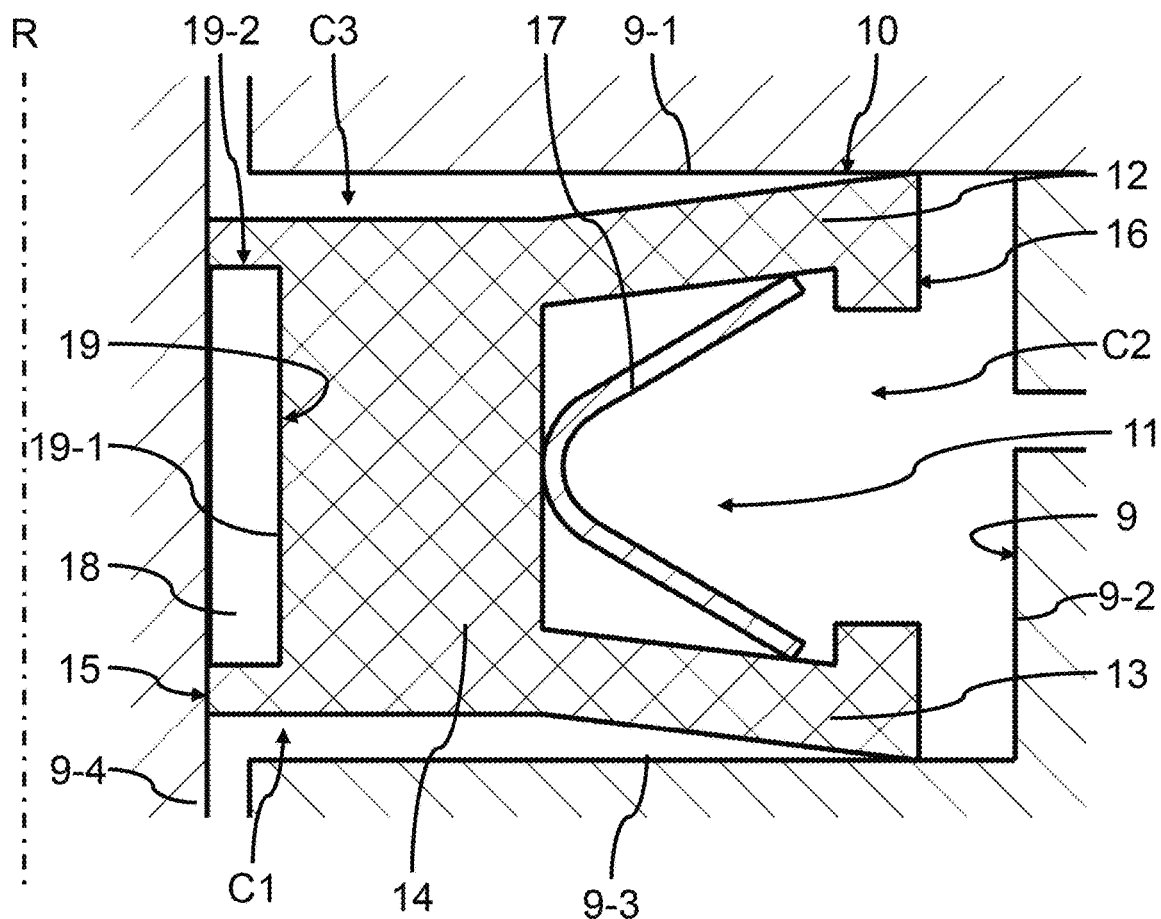
FIG. 3 is a cross-section view of a sealing device of FIG. 2.
Figure 4:
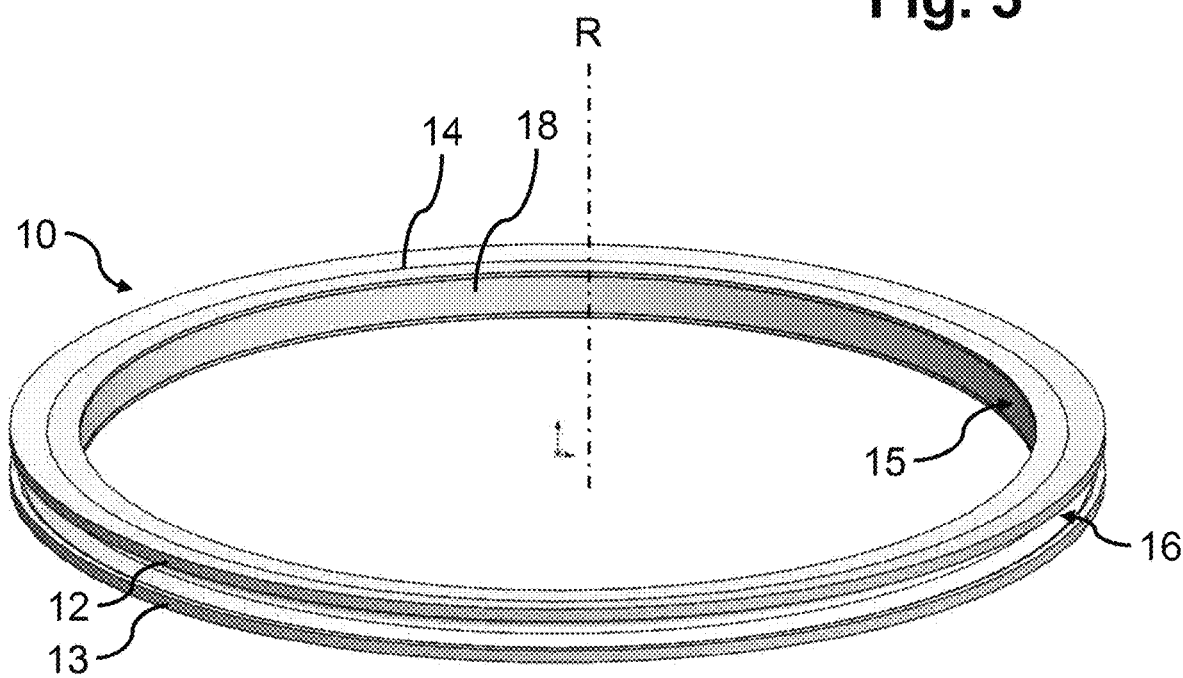
FIG. 4 is a perspective view of the sealing device of FIG. 3.

FIGS. 3 and 4 illustrate the sealing device 10.

The sealing device comprises an annular seal 11, having an axis of revolution R, and provided with a first lip 12 and with a second lip 13 extending from a body portion 14, the first lip 12 facing the second lip 13.

The device 10 has an inside face 15, an outside face 16 which is an opposite face to the inside face 15 and opposite lateral walls each meeting both the inside face 15 by a first end and the outside face 16 by a second end which is an opposite end to the first end.

The seal 11 is formed from a predetermined material having a first coefficient of friction.

The first and second lips 12 and 13 each extend from the body portion 14 in a respective direction which is inclined relative to a radial direction of the device 10. The body portion 14 and the lips 12, 13 are thus configured such that the seal 11 has, in section, the general shape of a V.

The lips 12, 13 define between them a cavity of the seal 11 and are furthermore each provided, at a respective free end, with a turned back portion directed towards the cavity of the seal 11. It will be noted that these turned back portions form an outside wall 16 of the seal 11.

The cavity of the seal 11 has a bottom delimiting the body portion 14 remotely from the inside face 15 of the seal, as well as sides extending from the bottom and formed by respective inside faces of the first and second lips 12 and 13.

It will be noted that the lateral walls of the seal 11 are formed by respective outside faces of the first and second lips 12 and 13, which are opposite faces to their respective inside faces.

The device may furthermore comprise a pre-stressing spring 17 accommodated in the cavity of the seal 11. This spring 17 is here a blade spring provided with two branches connected to each other by a junction portion. The junction portion of the spring 17 rests on the bottom of the cavity while the branches come respectively to bear against the inside faces of the first and second lips 12 and 13.

The sealing device 10 further comprises a ring 18, referred to as an anti-friction ring, formed from a second predetermined material different from the first predetermined material and having a second coefficient of friction different from the first coefficient of friction.

The ring 18 is securely connected with the seal 11 at the location of the body portion 14.

In particular, the ring 18 is accommodated permanently in the seal 11 and more specifically in a recess 19 provided in the body portion 14 remotely from the first and second lips 12 and 13. The recess 19 is formed in the inside face 15 of the seal 11. The recess 19 of the body portion 14 has a bottom 19-1 and a lateral wall 19-2.

The ring 18 is configured so as to cover between approximately 40% and approximately 95% of the inside face 15 of the seal 11.

The ring 18 has a free face, a bearing face which is an opposite face to the free face and is disposed against the bottom 19-1 of the recess 19 formed by the body portion 14, and a periphery disposed against the lateral wall 19-2 of the recess 19.

Here the groove 9 in which is inserted the sealing device 10, is delimited by a horizontal first wall 9-1, a vertical second wall 9-2, a horizontal third wall 9-3 which extends facing the horizontal first wall 9-1, the vertical second wall 9-2 extending between and meeting the first and third walls 9-1 and 9-3.

These walls 9-1, 9-2 and 9-3 are formed in the movable member 6.

The groove 9 in which is inserted the sealing device 10 is furthermore delimited by a vertical fourth wall 9-4 that extends facing the vertical second wall 9-2 at a distance from the first and third walls 9-1 and 9-3 which are horizontal.

This fourth wall 9-4 is formed in the system and here is part of the movable member 6.

When the sealing device 10 is present in the groove (see FIG. 3), a cavity C1 is formed between the lateral wall of the seal 11 adjacent the second lip 13 and the horizontal third wall 9-3; a cavity C2 is formed between the outside face 16 of the device 10 and the vertical second wall 9-2, the cavity C2 communicating with the cavity of the seal 11; and a cavity C3 is formed between the lateral wall of the seal 11 adjacent the first lip 12 and the horizontal first wall 9-1.

It will be noted that pipes for conveying fluids are provided in the first, second and third walls 9-1, 9-2 and 9-3 and open into the groove 9, and respectively into the cavities C3, C2 and C1.

A description will now be given of the cooperation of the sealing device 10 with the walls 9-1 to 9-4 of the groove 9.

The first and second lips 12 and 13 are in contact here, by their outside faces, respectively with the first and third walls 9-1 and 9-3 which are horizontal.

The body portion 14 is in contact here, at the location of the inside face 15 of the seal 11, with the vertical fourth wall 9-4.

The ring 18 is here in contact, by its free face, with the vertical fourth wall 9-4.

It is the major part of the ring 18 which comes to bear against the vertical fourth wall 9-4; while the major part of the body portion 14 does not bear against that vertical fourth wall 9-4.

In such an arrangement, the ring 18 covering the major part of the body portion 14 can slide against the vertical fourth wall 9-4 which is movable; while the first and second lips 12 and 13 cannot or practically cannot slide against the first and third walls 9-1 and 9-3 which are horizontal.

This is what is referred to as a radial mounting of the sealing device.

It will be noted that the body portion 14 enables the cooperation and the holding of the first and second lips 12 and 13 with the rest of the seal 11. The body portion 14 is a solid part which provides the mechanical integrity of the seal 11 and enables it to withstand the pressure of a fluid.

The spring 17, generally of steel, ensures clamping of the first and second lips 12 and 13 against the first and third walls 9 1 and 9-3 of the groove 9, forming the surfaces to seal.

The spring 17 furthermore enables the filling of the cavity of the seal 11 with a fluid, here referred to as pressurization fluid, by maintaining a sufficient contact pressure of the lips on the walls to avoid leakages.

A pressurization fluid is a fluid used to counter-pressurize the seal 11 in order to oppose a higher pressure of the main fluid. The cavity C2 and the cavity of the seal 11 are filled here with such a pressurization fluid, which is confined within those cavities by the action of the first and second lips 12 and 13.

On the contrary, the main fluid to transfer is present in the cavity 7 of the mechanism 4 at the junction between the fixed and movable members 5 and 6. The main fluid is also present in the cavity C1 of the groove 9, where the first lip 12 forms a barrier to prevent the main fluid from passing beyond towards the cavities C2 and C3.

On the contrary, the cavity C3 of the groove 9 is empty here when the seal provides its sealing function.

Here, the first coefficient of friction of the first predetermined material forming the seal 11 is greater than the second coefficient of friction of the second predetermined material forming the ring 18.

In particular, the first predetermined material is mainly formed here from polyetheretherketone, referred to as PEEK, and the second predetermined material is here mainly formed from polytetrafluoroethylene (PTFE) or from equivalent fluoro polymer materials (for example "perfluoroalkoxy alkane" or PFA, "polychlorotrifluoroethylene" or PCTFE, ethylene tetrafluoroethylene or ETFE) or polyurethane (PU). My "mainly" it is meant that the seal comprises more than 50% of the indicated material.

In the sealing device 10, the ring 18 makes it possible to provide optimized sliding of the body portion 14 of the seal 11 on the fourth wall 9-4 which is movable on account of the rotation of the member 6; such that the lips 12 and 13 of the seal 11 slide little or do not slide and therefore wear little or do not wear.

The sealing device 10 makes it possible to provide better resistance to pressures and/or temperatures that are relatively high; whereas the ring 18, which is attached to the seal 11 and which enables small friction forces to be withstood, is protected by the seal 11.

The first predetermined material has mechanical properties which enable it to mechanically withstand both pressure, temperature and dynamic stresses; while the second predetermined material has mechanical properties which enable it to mechanically withstand substantially dynamic stresses.

The first predetermined material furthermore has different mechanical properties from the second predetermined material in that the latter is more flexible and/or less hard than the first predetermined material.

The combination which is directed to securely connecting the ring 18 with the seal 11 and which is furthermore directed to having the ring 18 present a coefficient of friction lower than the seal 11 and therefore better withstand than the seal 11 in particular the friction forces undergone, thus makes it possible to supply a device 10 of which the service pressure and/or service temperature may be extended, of which the friction torque generated between the fixed 5 and movable 6 parts and the device 10 may be optimized, while limiting its premature wear and therefore increasing its live.

As indicated above, the seal is annular and therefore has an axis of revolution. According to the orientation of the axis of revolution relative to the lips, it is what is referred to as a face or radial seal when the axis of revolution is substantially perpendicular to the lips (as in the illustrated example), or what is referred to as a piston seal when the axis of revolution is substantially parallel to the lips.

It has been seen that in a radial seal, the lips act on the same member, which is movable put possibly fixed whereas the body portion acts here via the ring on the other member. Furthermore, it has been seen that the use of a radial seal requires a pressurization fluid.

In variants that are not illustrated:
the lips each extend from the body portion substantially in the radial direction of the seal such that the seal has, in section, a general shape of a U; and/or
only the main fluid passes within the cavities.

It should be noted more generally that the invention is not limited to the examples described and represented.

The invention claimed is:

1. A dynamic sealing device (10) configured to provide sealing between at least a first part and at least a second part having a relative rotational movement in relation to the first part, the device comprising:
a seal (11), provided with a body portion (14) having a first end portion and an opposite-facing second end portion, and with first and second lips (12, 13) extending respectively from opposite first and second sides of the first end portion of the body portion (14), the first lip (12) facing the second lip (13), and the seal (11) being formed from a first predetermined material having a first coefficient of friction; and
a ring (18) formed from a second predetermined material different from the first predetermined material and having a second coefficient of friction different from the first coefficient of friction,
wherein the ring (18) is securely connected with the seal (11) at a Ere location of the second end portion of the body portion (14), and
wherein the first coefficient of friction of the first predetermined material forming the seal (11) is greater than the second coefficient of friction of the second predetermined material forming the ring (18).

2. The device according to claim 1, wherein the first predetermined material is mainly produced from polyetheretherketone (PEEK) and the second predetermined material is mainly produced from a material chosen from polytetrafluoroethylene (PTFE), perfluoroalkoxy alkane (PFA), polychlorotrifluoroethylene (PCTFE), ethylene tetrafluoroethylene (ETFE) and polyurethane (PU).

3. The device according to claim 2, wherein the seal (11) is annular and the first and second lips (12, 13) each extend from the body portion (14) in a respective direction which is inclined relative to a radial direction of the seal (11).

4. The device according to claim 2, wherein the first and second lips (12, 13) define between them a cavity of the seal (11) and are furthermore each provided with a turned-back portion directed towards the cavity.

5. The device according to claim 1, wherein the seal (11) is annular and the first and second lips (12, 13) each extend from the body portion (14) in a respective direction which is inclined relative to a radial direction of the seal (11).

6. The device according to claim 5, wherein the body portion (14) and the first and second lips (12, 13) are configured such that the seal (11) has, in section, a general shape of a U or a V.

7. The device according to claim 5, wherein the first and second lips (12, 13) define between them a cavity of the seal (11) and are furthermore each provided with a turned-back portion directed towards the cavity.

8. The device according to claim 1, wherein the first and second lips (12, 13) define between them a cavity of the seal (11) and are furthermore each provided with a turned-back portion directed towards the cavity.

9. The device according to claim 1, wherein the ring (18) is configured so as to cover between approximately 10% and approximately 95% of an inside face (15) of the seal (11).

10. The device according to claim 1, wherein the ring (18) is permanently accommodated in the seal (11).

11. The device according to claim 10, wherein the ring (18) is accommodated in a recess (19) provided in the body portion (14) remotely from the first and second lips (12, 13).

12. The device according to claim 1, wherein the ring (18) is permanently accommodated in a recess (19) of the body portion (14) located at the second end portion of the body portion (14).

13. The device according to claim 1, wherein the ring (18) is accommodated in a recess (19) in an inside face of the seal (11) at the second end portion of the body portion (14), the recess (19) defined by a bottom and opposing inner edges, the ring (18) comprising a free face and a bearing face that is opposite the free face and disposed against a bottom (19-1) of the recess (19), the opposing inner edges of the recess fitting against opposing outer edges of the ring (18).

14. The device according to claim 1, wherein the first and second lips (12, 13) extend respectively from opposing first and second side-most portions of the first portion of the body portion (14).

15. The device according to claim 1, wherein the seal (11) is annular and the first and second lips (12, 13) extend from the body portion (14) in respective directions away from one another and inclined relative to a radial direction of the seal (11).

16. The device according to claim 1, wherein the first and second lips (12, 13) define between them a cavity of the seal (11), and end-most portions of the first and second lips (12, 13) are each provided with a turned-back portion, each said turned-back portion directed towards the cavity.

17. A dynamic sealing device (10), configured to provide sealing between at least a first part and at least a second part having a relative rotational movement in relation to the first part, the device comprising:
a seal (11), provided with a body portion (14), and with first and second lips (12, 13) each extending from the body portion (14), the first lip (12) facing the second lip (13), the seal (11) being formed from a first predetermined material having a first coefficient of friction, the first and second lips (12, 13) defining between them a cavity of the seal (11) and are furthermore each provided with a turned-back portion directed towards the cavity;

a pre-stressing spring (17) accommodated in the cavity of the seal; and a ring (18) formed from a second predetermined material different from the first predetermined material and having a second coefficient of friction different from the first coefficient of friction, wherein the ring (18) is securely connected with the seal (11) at the location of the body portion (14), and wherein the first coefficient of friction of the first predetermined material forming the seal (11) is greater than the second coefficient of friction of the second predetermined material forming the ring (18).

18. The device according to claim 17, wherein the pre-stressing spring (17) urges the first and second lips (12, 13) apart from one another.

19. A connecting mechanism (4) for connecting at least a first part with at least a second part having a relative rotational movement in relation to the first part, comprising:

a first member (5) configured to be connected to the first part;

a second member (6) movable relative to the first member (5) and configured to be connected to the second part, the first member (5) and the second member (6) being connected with each other for the transfer of a fluid from one of the first and second parts to the other of the first and second parts; and a sealing device (10) disposed in at least one groove (9) provided in the mechanism located at a junction between the first member (5) and the second member (6), the sealing device comprising a seal (11), provided with a body portion (14), and with first and second lips (12, 13) each extending from the body portion (14), the first lip (12) facing the second lip (13), the seal (11) being formed from a first predetermined material having a first coefficient of friction, and a ring (18) formed from a second predetermined material different from the first predetermined material and having a second coefficient of friction different from the first coefficient of friction, wherein the ring (18) is securely connected with the seal (11) at a location of the body portion (14), wherein the first coefficient of friction of the first predetermined material forming the seal (11) is greater than the second coefficient of friction of the second predetermined material forming the ring (18), and wherein the first member (5) forms part of a mooring turret (3) of a floating production unit (1), and the second member (6) forms part of a platform extending from a ship (2) moored to the mooring turret.

20. The mechanism according to claim 19, wherein the first and second lips (12, 13) extend from respective opposing side-most portions of the body portion (14).

* * * * *